US008819186B2

(12) United States Patent
Harris

(10) Patent No.: US 8,819,186 B2
(45) Date of Patent: Aug. 26, 2014

(54) FILE SYSTEM FOR PORTABLE DEVICE

(76) Inventor: Scott C. Harris, Rancho Santa Fe, CA (US)

( * ) Notice: Subject to any disclaimer, the term of this patent is extended or adjusted under 35 U.S.C. 154(b) by 0 days.

(21) Appl. No.: 13/299,434

(22) Filed: Nov. 18, 2011

(65) Prior Publication Data

US 2012/0131149 A1 May 24, 2012

Related U.S. Application Data

(60) Provisional application No. 61/415,176, filed on Nov. 18, 2010.

(51) Int. Cl.
*G06F 15/16* (2006.01)

(52) U.S. Cl.
USPC ........... 709/219; 709/203; 709/216; 709/226; 709/236; 709/246

(58) Field of Classification Search
USPC .......... 709/219, 203, 216, 218, 226, 236, 246
See application file for complete search history.

(56) References Cited

U.S. PATENT DOCUMENTS

2006/0212542 A1 * 9/2006 Fang et al. .................... 709/219
2008/0250024 A1 * 10/2008 Kvm et al. ..................... 707/10

* cited by examiner

*Primary Examiner* — Lan-Dai T Truong
(74) *Attorney, Agent, or Firm* — Law Office of Scott C. Harris, Inc.

(57) ABSTRACT

The present application teaches a special kind of filesystem and/or connection for a computer device and especially for a computer device of the type which includes reduced resource capability.

3 Claims, 2 Drawing Sheets

FILE SYSTEM FOR PORTABLE DEVICE

This application claims priority from provisional application No. 61/415,176, filed Nov. 18, 2010, the entire disclosure of which is herewith incorporated by reference.

BACKGROUND

Different kinds of portable devices may be used to display and/or play different kinds of information. For example, portable devices may include a laptop shown as 100, a tablet such as an iPad shown as 105, or a PDA/cell phone shown as 110.

Because of the small size of these devices, they typically have less resources including less storage space, processing space and other kinds of resources.

Tablet computers have become popular where the computer is built into the housing behind the display. In these devices, most of the device, e.g., 80% or the area of more of the device, forms display area. A selectable screen, e.g. a touchscreen, is used to enter commands. These devices use the front screen as both the display screen and the user interface screen, and it may be desirable to interface these devices with a more desk oriented device.

SUMMARY

The present application teaches a special kind of filesystem and/or connection for a computer device and especially for a computer device of the type which includes reduced resource capability.

BRIEF DESCRIPTION OF THE DRAWINGS

The different figures show different embodiments, specifically.

DETAILED DESCRIPTION

A tablet style computer is defined according to the present application as being a computer where where 50% or more of one surface of computer forms a display, and where commands can be entered on the display, e.g., by a touch screen. However, the present system may be used with a number of different kinds of computers, although preferably the system is used with a reduced-resource computer such as a tablet 105, laptop 101 or PDA 110.

Figure 1:
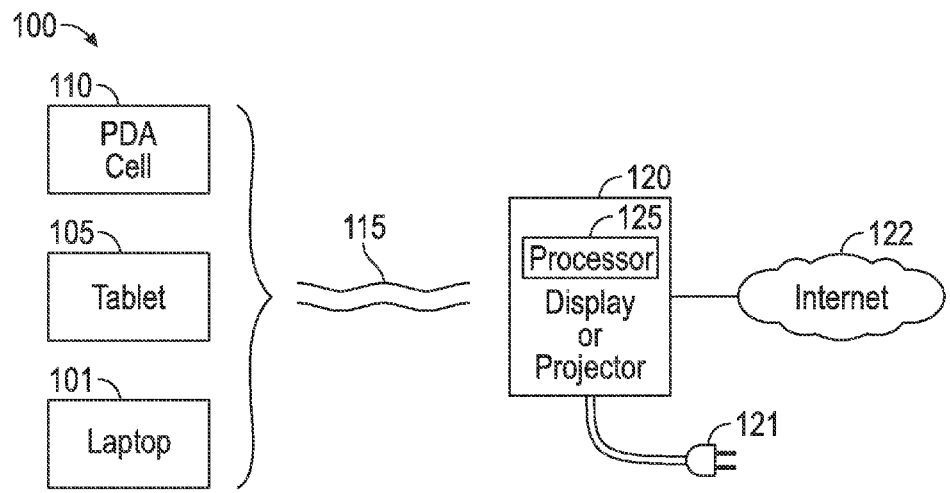
FIG. 1 shows multiple computers connecting to an external device.

The computers are generically shown as 100 in FIG. 1. The computer is connected via a connection 115 to an external display device 120. For example, the external display device may be a display or projector. In the FIG. 1 embodiment, the connection is a wireless connection for example wireless HDMI or other connection. The display, however, typically is wire connected and includes an AC plug 121 that drives the display and a wired Internet connection 122. As an alternative, however, the display may also be wireless. The display may have a faster display or higher degree of resources than the computer 100.

Figure 2:
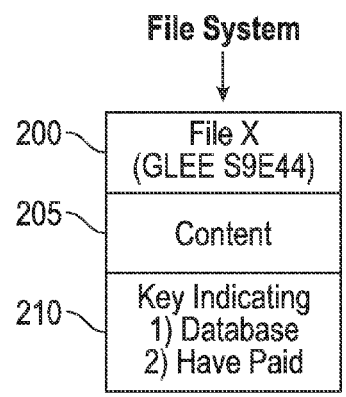
FIG. 2 shows a file system.

In an embodiment, the computer 100 stores a file system of the type shown in FIG. 2. For example, this filesystem may include a list of multimedia files (e.g., video and/or audio). Each file is a file that has been flagged by the user in some way, e.g., as a file they want to view/listen to, or as a file they have already paid for or listened to.

The file system includes file header 200, content 205 and key 210. The file header 200 may indicate information about the file itself. For example, 200 may indicate the file number and its name, here glee season 9 episode 44. The content 205 may include the file content, which is the actual item that is going to be played including video, audio, and other content which will be played. The key 210 indicates the different things about the file. In the embodiment, the key may indicate information that provides the key to the database that is a remote database. For example, glee episode season 9 episode 44 may be stored in a remote glee database, and the key to that database may be provided in 210. Another part of the key 210 may indicate that or if the user has paid for access to the file, and therefore can obtain access to the file.

The content 205 may be partial content e.g., a partial video portion of the database, thereby allowing a scenario where the user's device does not need to save/store the entire file. Reduced resource computers, such as iPads and the like, may have limited amounts of storage. The content 205 may be only a part of the content to be played, so that less information needs to be stored on the iPad device. As explained herein, part of the content is stored, so that things can be played while the computer is downloading other parts of the file to be played.

Another advantage of providing this partial storage, however, is that the content owner retains the ability to change the different parts of the content. For example the content owner can add new scenes, or can annotate the file as shown in my application Ser. No. 12/348,076, filed Jan. 2, 2009 to add different advertisements to the file.

Figure 3:
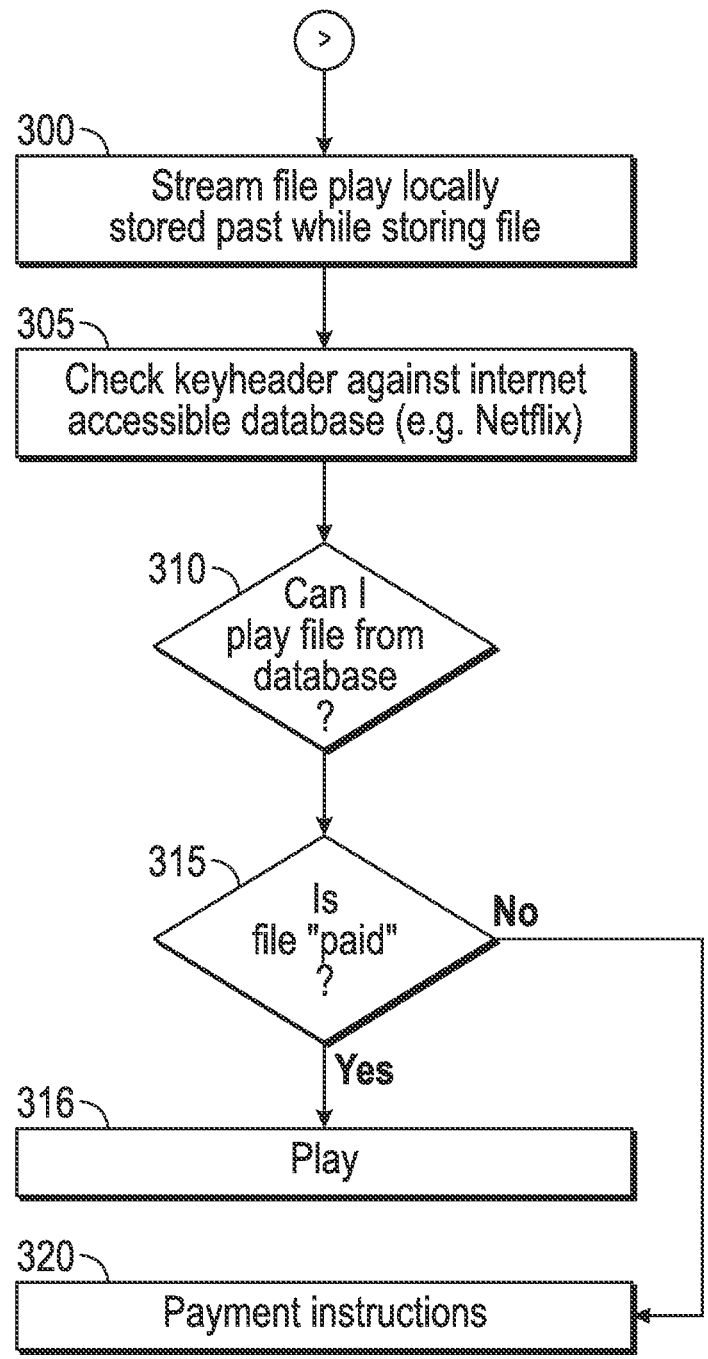
FIG. 3 shows a flowchart of operation.

In operation, the system may operate as shown in FIG. 3. FIG. 3 shows a flowchart that shows how files can be played the flowchart of FIG. 3 can be executed for example by a computer e.g. the processor 125 in the display 120. At 300, the system streams or otherwise sends the file header and/or any locally stored part of the file to the remote display 120. The locally stored part of the file may include the beginning part of the file. However, the locally stored part of the file preferably does not include the entire file contents: only a first portion of the file that can be played for a time that is long enough for the display 122 use the key 210 to start downloading or peer to peer obtaining the file from an Internet source.

While the stored portion of the file, that was stored in the computer 100, is being sent or played by the display 100, operations are carried out to obtain the rest of the file. The key is checked against Internet databases at 305. For example, if the user wants to play Glee season 9 episode 44, one Internet database where this might be stored is in Netflix. The key can also indicate a database, or can indicate the kind of database that might have these files. For example, the database might indicate that only a publisher database might have the file, for example.

If the file is found, at 310, the system determines if it can play the file from the database, for example is the user a member of Netflix or is there an agreement in place that allows the user to play from this repository. An additional and/or alternative file identifier/stamp may indicate, as in FIG. 2, that the user paid for access to the file. In that case, even if the user is not a member of Netflix, the file owner may have made arrangements with Netflix to allow non-members to obtain files from the Netflix database, e.g., as part of the agreement to allow Netflix to send those files to others. Another option is that the user can pay for a file and obtain that file from a public repository of files, shown at 315. If possible, the file is played from the database at 316. If the file cannot be played for whatever reason, payment instructions or other instructions may be returned at 320.

According to another embodiment, the locally stored part at 205 may include the first 5 min. of the file, or the first 2 min. of the file to allow the file to be played while the repository checking and/or downloading is going on.

In this way, the display 120 receives information about the file, but does not receive the entire file itself. The display 120 may receive the content 2054 partial file, and display that while it is negotiating or otherwise finding the rest of the file from one of a number of different Internet databases. The file is directly received over 122 and displayed over the display, after the initial part of the file has been received via a wireless HDMI over 115. The key and other file information to tab may also be received wirelessly, causing the display 120 to receive the wired information over 122

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example other kinds of displays and/or computers can be controlled in a similar way to allow immediate access to files from reduced amounts of file storage. In an embodiment, the display can plays one portion of the file part that is being downloaded while other parts are still being downloaded. For example, this can divide the files up into multiple parts, or use a peer to peer system which puts priority on the first to be played parts of the file.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, display port, or any other form.

When operated on a computer, the computer may include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a computer readable medium having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display device comprising:
   a display part, that displays information received from a remote source;
   a wireless network connection and a wired network connection;
   a microprocessor that carries out an operation to:
   receive only a beginning portion of a file over the wireless network connection, and also receive information which enables finding the rest of the file on the network over the wired network connection, and
   to play said beginning portion of said file while downloading other parts of said file over the network wired connection and playing said other parts, at a time subsequent to downloading said beginning portion,
   wherein said beginning portion defines a playing time of a length effective to allow playing during a time before the rest of the file starts downloading.

2. The display device as in claim 1, wherein said display part also plays one portion of said other parts of said file while downloading another portion of said other parts of said file.

3. The display device as in claim 1, wherein said network connection includes an Internet connection.

* * * * *